Patented Nov. 20, 1951

2,575,693

UNITED STATES PATENT OFFICE 2,575,693

3,5-DIMETHYL-5-ETHYLOXAZOLIDINE-2,4-DIONE

Marvin A. Spielman, Waukegan, Ill., assignor to Abbott Laboratories, North Chicago, Ill., a corporation of Illinois No Drawing. Application March 2, 1949, Serial No. 79,294

1 Claim. (Cl. 260—307)

The present invention relates to the chemical compound 3,5-dimethyl-5-ethyloxazolidine-2,4-dione represented by the following formula:

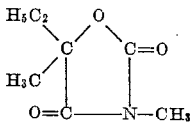

The present invention is based upon a research investigation resulting in the discovery that the presence of a methyl group at the 3-position produced radical changes in the therapeutic properties of certain 5-lower alkyl and 5,5-di-lower alkyloxazolidine-2,4-diones. With continued investigation it was discovered that the N-methyl compounds having a lower alkyl group or groups containing from one to three carbon atoms at the 5-position, possess valuable therapeutic properties. It was discovered in particular that of these compounds, the compound 3,5-dimethyl-5-ethyloxazolidine-2,4-dione displayed especially valuable therapeutic properties.

The basic ring of the compound of the present invention is known in the art as oxazolidine-2,4-dione. This compound as well as the 5-methyl-5-ethyl derivative used in preparing the compound of the present invention, may be produced by various processes. For example, the 5-methyl-5-ethyl oxazolidine-2,4-dione may be prepared by reacting methyl ethyl ketone with sodium cyanide and with ammonium thiocyanate followed by desulfurization. This intermediate may also be prepared by condensing α-hydroxy-α-methylbutyramide with ethyl chlorocarbonate or by condensing ethyl α-hydroxy-α-methylbutyrate with urea. Another method described (Traube and Aschar, Ber., 46, 2,077—1913) consists in the condensation of ethyl α-hydroxy-α-methylbutyrate with guanidine followed by hydrolysis.

The compound 3,5-dimethyl-5-ethyloxazolidine-2,4-dione of the present invention may be prepared by various processes. The most satisfactory process involves the alkylation of the 5-methyl-5-ethyl oxazolidine-2,4-dione intermediate with dimethyl sulfate. The following example will serve for illustrative purposes:

*3,5-dimethyl-5-ethyloxazolidine-2,4-dione*

About 143.1 grams (one mole) of 5-methyl-5-ethyloxazolidine-2,4-dione is dissolved in 300 cc. of methanol containing 23 grams of sodium. To the above mixture is added 126 grams of dimethyl sulfate in 10 cc. portions while the temperature is maintained at about 50° C. by external cooling. The mixture is then heated briefly to boiling, cooled, diluted with about 500 cc. of water and extracted with two 250 cc. portions of benzene. The benzene extract is separated, washed once with sodium bicarbonate solution and once with water. The benzene is removed by evaporation on a steam bath and the residue is fractionally distilled. The material boiling at 112 to 116° C. at 25 mm. pressure is taken; $n_D^{25}=1.4495$. Upon further fractionation, a very pure specimen boils at 101–102° C. at 11 mm.; $n_D^{25}=1.4507$.

The compound of the present invention is characterized by its analgesic properties coupled with substantially low or relatively no hypnotic activity. More particularly, the compound has been found to be an excellent anticonvulsant in the treatment of petit mal epilepsy.

This application is a continuation-in-part of my co-pending application Serial No. 779,424, filed October 11, 1947, which in turn is a continuation-in-part of application Serial No. 630,944, filed November 26, 1945, now abandoned, which in turn is a continuation-in-part of my original application Serial No. 403,073, filed July 18, 1941, now abandoned.

Others may readily adapt the invention for use under various conditions of service, by employing one or more of the novel features disclosed, or equivalents thereof. As at present advised with respect to the apparent scope of my invention, I desire to claim the following subject matter.

I claim:

The compound 3,5-dimethyl-5-ethyloxazolidine-2,4-dione represented by the following formula:

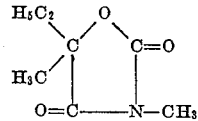

MARVIN A. SPIELMAN.

REFERENCES CITED

The following references are of record in the file of this patent:

Chemical Abstracts, vol. 14, pp. 46 to 48 (1920).
Beilstein, 4th Ed., vol. 27, pp. 251 to 253 (1937).
Groggins, "Unit Processes in Organic Synthesis," McGraw-Hill, 2nd Ed., pp. 488–489 (1948).